Jan. 30, 1968 J. A. GITHENS 3,366,931

INFORMATION STORAGE SYSTEM

Filed March 23, 1965 6 Sheets-Sheet 1

INVENTOR
J. A. GITHENS
BY
ATTORNEY

United States Patent Office 3,366,931

Patented Jan. 30, 1968

3,366,931

INFORMATION STORAGE SYSTEM

John A. Githens, Morris Township, Morris County, N.J., assignor to Bell Telephone Laboratories, Incorporated, New York, N.Y., a corporation of New York Filed Mar. 23, 1965, Ser. No. 442,037
22 Claims. (Cl. 340—172.5)

ABSTRACT OF THE DISCLOSURE

An associative memory comprising a plurality of storage cells is disclosed. Each of the cells includes a plurality of flip-flops, apparatus for performing matching and logical functions associated with the flip-flops, and magnetic cores. Data is stored in both the flip-flops and the magnetic cores. The flip-flops are accessed directly and if desired simultaneously while the magnetic cores are accessed via one of the flip-flops. Various logical or arithmetic operations, e.g., addition and subtraction, may be performed upon data stored in the flip-flops.

This invention relates to information storage and retrieval systems, and more particularly to such systems in which the identification of data is based on content rather than location.

In many memory units in current use each location has a respective address. To write data into a location or to retrieve data from it requires the addressing of the particular location. For reference purposes such units may be designated direct access memories. Another type of memory is the associative memory in which data is retrieved by matching stored information with retrieval data. Each memory location may include a stored information symbol along with data. A retrieval symbol is applied simultaneously to each storage location or cell and a "match" is obtained with the particular cell whose stored information symbol is the same as the retrieval symbol. When a match is obtained the data stored in the particular storage location or cell, or the data stored in an adjacent cell, may be retrieved. An example of such an associative memory is disclosed in the copending application of Crane et al., Ser. No. 395,161, filed Sept. 9, 1964.

As described in the above-identified Crane et al. application the associative memory provides some powerful data processing features. Unlike direct access memories data may be processed in the memory itself as well as being stored therein. The logic circuitry required in each cell for the MATCH operation may be used advantageously for data processing. The Crane et al. associative memory is particularly well suited for those applications in which logical operations must be performed simultaneously on a large number of quatities, i.e., where bulk processing is desired.

Each cell in the Crane et al. system includes a series of flip-flop elements as well as logic circuits associated with each. Each flip-flop stores one bit of information, and bits may be written into or read out of all of the flip-flops in a particular cell at the same time. The cost on a per-bit basis is appreciable however because to store and operate on any single bit one flip-flop and various logic circuits are required.

It is, therefore, a general object of this invention to decrease the cost of an associative type memory without however materially affecting the data processing capabilities of the memory.

Briefly, in accordance with my invention some of the flip-flops in each cell of the Crane et al. system are replaced by magnetic cores. The logic circuitry associated with each bit-storage element in the Crane et al. cell is not provided with each of the magnetic cores in the cell of my invention. Instead, the logic circuitry is provided only for the flip-flops in each cell. In the Crane et al. system the same numbered flip-flop in each cell is connected to respective input and output conductors. In the cell of my invention no input and output conductors are provided for the magnetic core storage elements. That is, bit values may not selectively be written into the magnetic cores nor may bit values directly be read out of the cores. Instead, one of the flip-flops in each cell is selectively connectable to all of the cores in the same cell. Bits may be directly written into or read out of this flip-flop as well as the other flip-flops in the cell. But if it is desired to write a bit into a particular core the bit value must first be written into the connectable flip-flop, the flip-flop then controlling the writing operation in the core. Similarly, to read the bit value stored in a core it is necessary to transfer the value from the core to the connectable flip-flop and to then read the bit value from the flip-flop.

Such an arrangement does not allow operations to be performed simultaneously on all of the cores in a particular cell. Thus it takes longer to operate on the cores than it does to operate on the flip-flops in each cell. Nevertheless my cell arrangement does enable a much cheaper system to be constructed with most of the powerful data processing capabilities of the Crane et al. associative memory being retained.

It is a feature of this invention to provide in each cell of an associative memory two types of storage elements, e.g., flip-flops and magnetic cores.

It is another feature of this invention to provide means for allowing the transfer of bit information between any one of the cores in a cell and a selected one of the associated flip-flops.

It is still another feature of this invention to store data in or retrieve data from a core in any cell by operating upon the respective selected flip-flop in the cell.

Further objects, features and advantages of the invention will become apparent upon consideration of the following detailed description in conjunction with the drawing in which:

FIG. 1, except for the rearrangement of the elements, is the same as FIG. 1 in the above-identified Crane et al. application and is a simplified block diagram representation of the associative memory disclosed therein;

Figure 1:
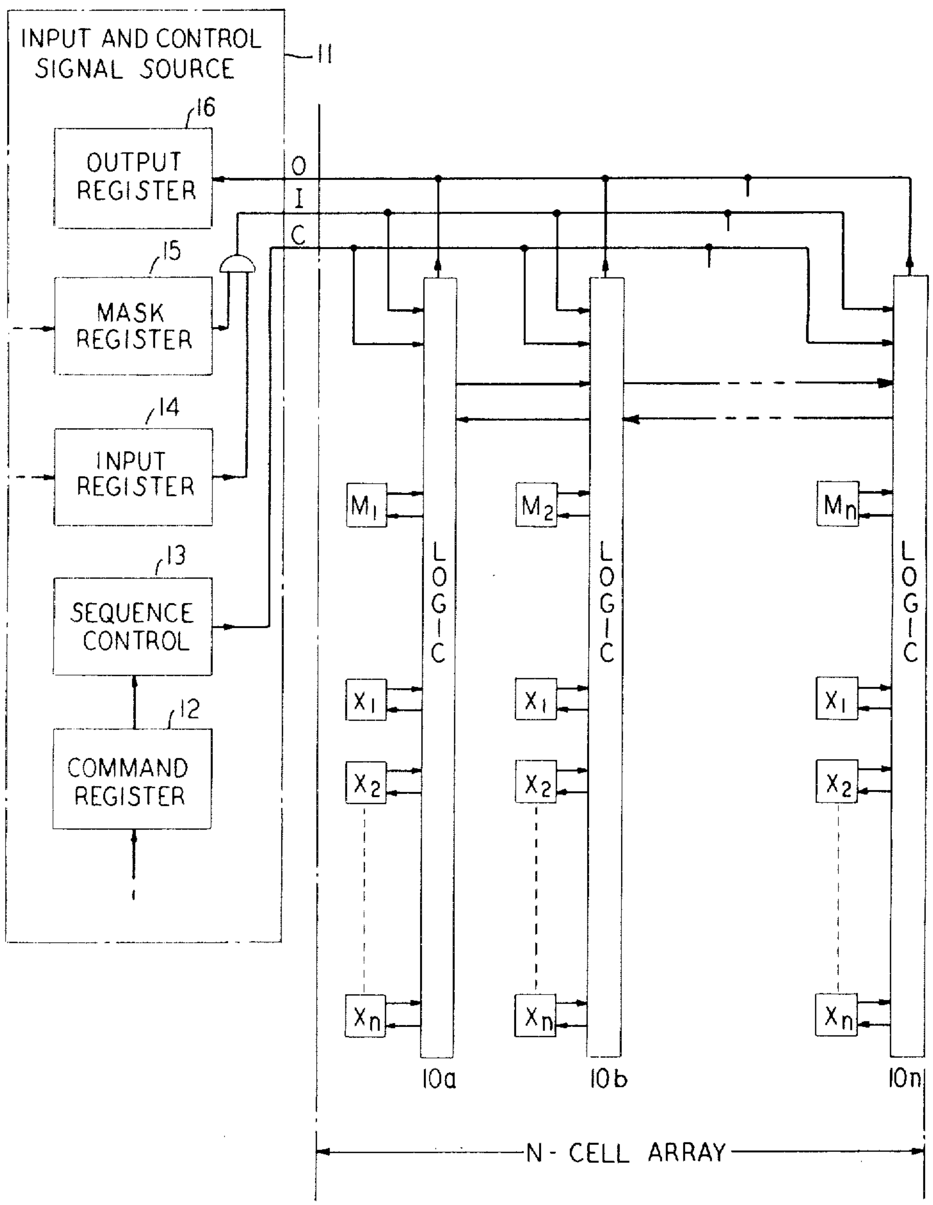

My invention may be best understood by first examining the organization of, and the details of a particular cell in, the Crane et al. system. FIG. 1 shows an arrangement of identical cells in an associative memory in which operations are performed in parallel on cells under common control. Each identical cell 10$a$, 10$b$ . . . 10$n$ is essentially an $n$ bit storage register combined with logic circuits for controlling operations on the register's contents, all cells being connected in parallel to a set of data input and command leads. The arrangement is a series network of interconnected cells, with each cell connected to the succeeding and preceding cells in the network chain.

Each cell contains identical circuitry for facilitating storage, matching, propagation and retrieval operations; viz, $n$ data registers $X_1, X_2 \ldots X_n$; a match circuit M and control logic. Signals from an input and control signal source 11 are supplied to each cell over various leads designating the particular operation to be performed; whereupon, the content of each cell is either altered to store new data, compared with matching data, or retrieved. The cells are joined by propagate leads and, upon receipt of proper directives, propagate control signals in either direction to activate adjacent cells, thereby placing them in condition for a possible match of their content with the next applied signal.

Thus the array responds to three basic types of commands, MATCH, STORE, and READ, as directed by the input and control signal source 11 which comprises signal generation and timing circuitry well known in the art. A command to be executed is held in the command register 12 until it is translated into control signals by the sequence control 13. These signals, in turn, drive the control logic in all cells simultaneously via the common control lines C.

The MATCH command finds all cells, the contents of which match the content of the input register 14, and marks those cells by setting their match circuits M. A cell so marked may then be placed in an "active" condition. Every cell, the content of which does not match that of the input register, may have its match circuit reset. This command is implemented by supplying the content of the input register 14 to all cells simultaneously via the input lines I. Each cell's logic then determines whether the pattern of inputs matches its content and either sets or resets the respective match circuit.

The MATCH command, therefore, provides a simultaneous search of all cells. The mask register 15 can be used to mask out bit positions of the input register 14. This enables searching a subset of data registers in every cell while disregarding the remaining data registers. For example, all bit positions of the input register 14 except those corresponding to $X_2$ and $X_3$ can be masked out, resulting in all cells in which the contents of the $X_2$ and $X_3$ registers agree with those bit positions having a successful match regardless of the contents of the other data registers.

The cell logic is such that the MATCH command can specify cell activity in its comparison pattern as well. This makes it possible to search only active cells, thereby finding a subset within a subset of cells. For example, all active cells not containing $X_2=0$, $X_3=1$ can be deactivated.

The cell logic also enables a directional MATCH command where a cell matching the comparison specification is not activated, but its nearest left or right neighbor is. Therefore, including cell activity in the comparison specification of a directional MATCH command enables a cell to transfer its activity to either of its two nearest neighbors.

In the STORE command, the content of the input register 14 is supplied to all cells simultaneously via the input lines I. The cell logic is designed to respond to two types of STORE commands, conditional and unconditional. With the conditional STORE command only active cells are involved and the contents of inactive cells are not disturbed. With the unconditional STORE command all cells store the input data, regardless of activity status. As in the MATCH command, the mask register 15 can be used to specify "don't cares" in any of the bit positions. Masking out a bit position in the input register 14 avoids disturbing the content of the corresponding data register in each cell.

The READ command retrieves the content of an active cell and places it in the output register 16 via the output lines 0. Since all cells share common output lines, it is necessary to ensure that only one cell is active before reading. Otherwise the output register 16 will contain the logical OR of the contents of all active cells, and the content of any one cell will be indistinguishable. A single active cell can be isolated through the use of MATCH commands.

Figure 2:
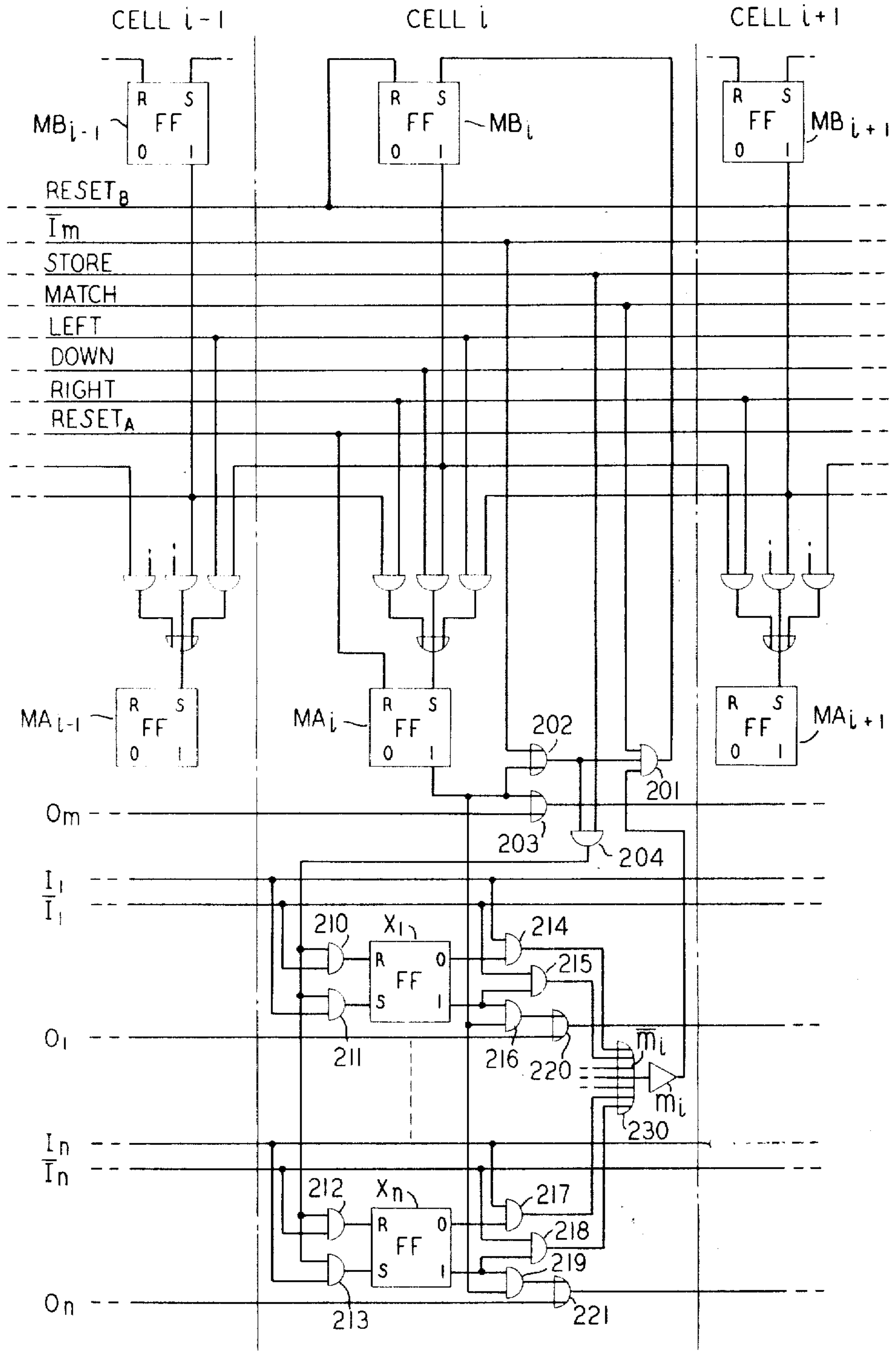
FIG. 2 is the same as FIG. 2 in the above-identified Crane et al. application and shows an illustrative cell suitable for use in the Crane et al. system.

FIG. 2 shows the logical organization of an $n$-bit cell in the Crane et al. system of FIG. 1. Each cell includes $n$ flip-flops $X_1$ through $X_n$. The eight control lines, $2n$ input lines, and $n+1$ output lines are common to all cells. Cell $i$ is shown in detail, and cells $i-1$ and $i+1$ are shown partially in order to indicate how cell activity can be transferred from one cell to another. The match flip-flop M is double-ranked to form match flip-flops $MA_i$ and $MB_i$, thereby eliminating the possibility of race conditions in the directional MATCH commands. Flip-flop $MA_i$ represents cell activity (1 for active, 0 for inactive), and flip-flop $MB_i$ serves as temporary storage for the result of a MATCH command. The result of a successful match ($MB_i=1$) is used to set one of the three MA flip-flops ($MA_{i-1}$, $MA_i$ and $MA_{i+1}$) connected to $MB_i$. Which MA flip-flop is set depends on which of the three control lines, LEFT, DOWN, or RIGHT, is pulsed. The LEFT and RIGHT lines are used in directional MATCH commands.

In MATCH commands the comparison of the contents of a cell's data flip-flops, $X_1 \ldots X_n$, with the signals on the input lines, $I_1, \bar{I}_1 \ldots \bar{I}_n$, is performed by AND gates such as 214, 215, 217, and 218. These $2n$ AND gates connect to OR gate 230 so that a mismatch in one or more of the data flip-flops produces a signal $\overline{m}_i=1$. Not caring about the content of a data flip-flop is accomplished by not pulsing either of its input lines. Signal $\overline{\overline{m}}_i$, the inversion of $\overline{m}_i$, is therefore 1 only when no mismatches occur, and is an input to AND gate 201 to the right of the $MA_i$ flip-flop in FIG. 2. Another input to AND gate 201 is through OR gate 202, the inputs of which are the $MA_i$ flip-flop and the $\bar{I}_m$ control line. This arrangement allows specifying cell activity in the matching pattern. Not caring about cell activity is accomplished by pulsing the $\bar{I}_m$ control line. Pulsing the MATCH control line, the third input to AND gate 201 sets the $MB_i$ flip-flop if a successful match has occurred.

In STORE commands AND gates 210, 211 . . . 212, and 213 to the left of the data flip-flops $X_1$ through $X_n$ control the transfer of signals on the input lines to the data flip-flops. In the conditional STORE command a signal on the STORE control line is gated by the $MA_i$ flip-flop via OR gate 202 and AND gate 204, causing only active cells to store the input data. In the unconditional STORE command the $\bar{I}_m$ control line is also pulsed, causing both active and inactive cells to store the input data. In both types of STORE commands those data flip-flops whose contents are to remain undisturbed do not have signals on either of their input lines.

When a cell is active, each of its set data flip-flops puts an output signal on its respective output line which it shares with corresponding data flip-flops in all other cells through the corresponding OR gates such as 220 and 221 in FIG. 2. The cells need not receive any control signals; therefore, to respond to a READ command, it is sufficient to inspect the $n+1$ output lines coming out of the array. The necessity for having only one active cell when reading out the contents of data flip-flops is evident. An input pattern must accompany the MATCH and STORE commands in order to specify which cell flip-flops are to be operated upon; an input pattern need not accompany a READ command. The additional output conductor $O_m$ is provided to enable the control to determine if at least one cell is active.

The PROPAGATE command can be viewed as an extended directional MATCH command by which an already active cell can propagate its activity through "strings" of adjoining cells whose contents match the input pattern specified with the command. It says, in effect: "Activate all cells between an already active cell and the first cell to its left (right) that does not match the input pattern." It is accomplished by the following sequence of commands:

$RESET_B$
MATCH · ($I_1$=don't care)
MATCH · LEFT (RIGHT) · ($I_1$)
$RESET_A$
DOWN After all of the MB flip-flops are reset the first set of input signals ($I_1$=don't care) causes the signal $m_1=1$ to appear at the output of OR gate 230 in all cells; but since $\bar{I}_m$ is not pulsed, the $MB_1$ flip-flop of only already active cells is set to 1. The second set of input signals ($I_1$) then causes only those cells whose contents match the input to have $m_1=1$. Therefore, simultaneous application of the MATCH and LEFT (RIGHT) control signals causes the activity condition to be stored in the $MB_1$ flip-flop of an originally active cell followed by those cells whose contents match the input pattern. At the end of the third step all cells in the chain are active, and all cells except the leftmost (rightmost), the one with the mismatch, have their MB flip-flops set. The $RESET_A$ command resets all of the MA flip-flops and the DOWN command controls the setting of all the MA flip-flops in the chain except the last, as desired. An equally useful PROPAGATE command can be formed by applying $RESET_A$ and LEFT (RIGHT) as the final control signals. This causes the string of active cells to be displaced one cell to the left (right).

Figure 3:
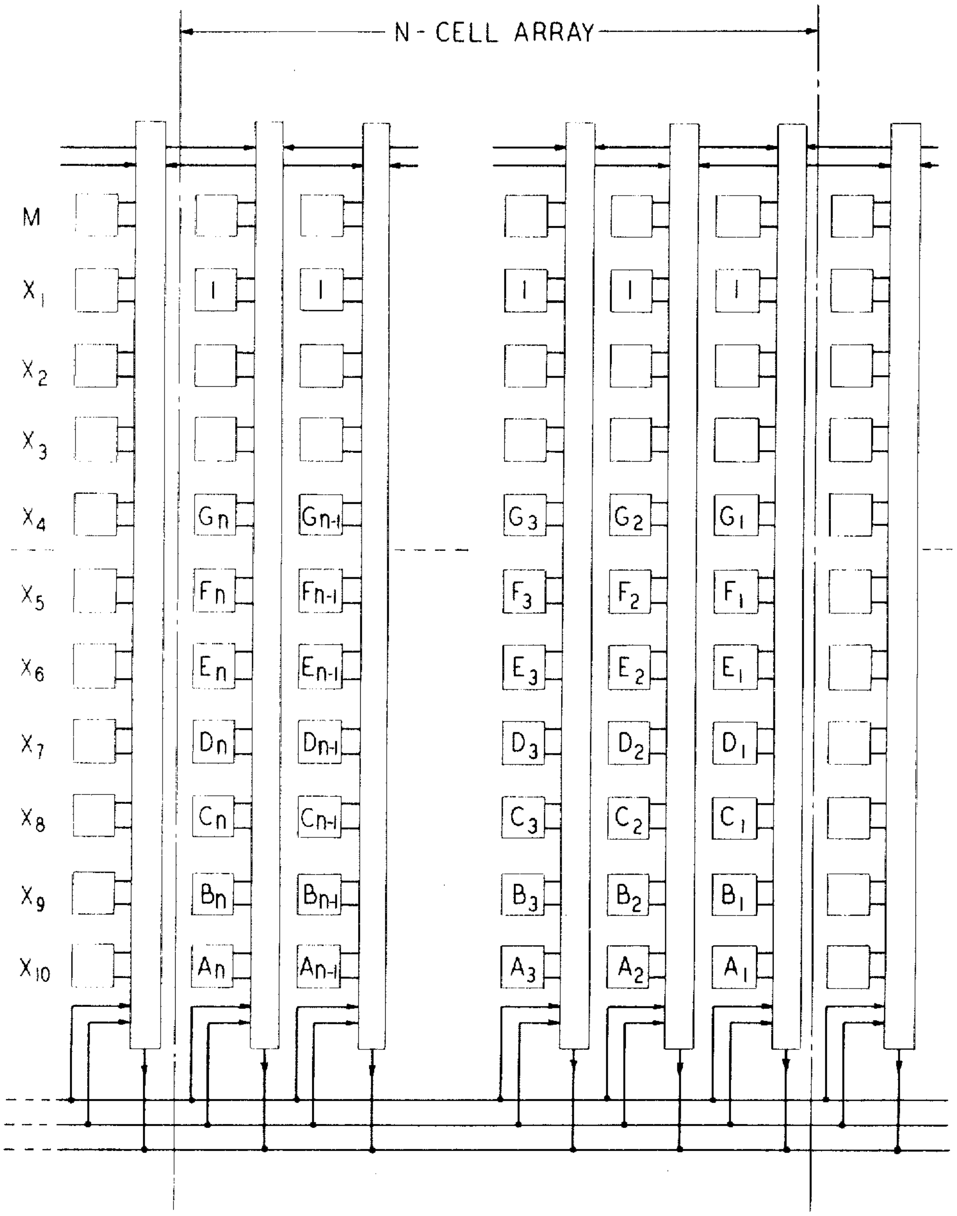
FIG. 3 is the same as FIG. 3 in the above-identified Crane et al. application and is a representation in block diagram form of a plurality of cells containing data organized for bulk processing.

The data processing capabilities of the Crane et al. associative memory may be best understood by considering a particular example. Assume that the data storage is as shown in FIG. 3 where seven $n$-bit words, A, B . . . G, are stored in $n$ consecutive cells. Data flip-flops $X_1$, $X_2$, and $X_3$ are shown as being reserved in each cell for control purposes. For example, $X_1=1$ in a given cell could mark that cell as containing bits of words to be operated upon.

The reason for storing data words in this manner is that one match flip-flop is available to each bit of a word. This allows searching all bits of a word simultaneously, and when two words are stored side-by-side in this manner, their corresponding bits can be simultaneously searched. As will be seen, this enables arithmetic operations to be performed on any number of such pairs, where each pair is in a different set of cells, on a parallel by-word, parallel-by-bit basis.

A simple addition operation serves to illustrate how a linear array of cells can be used to perform an arithmetic operation on many sets of data simultaneously. Suppose in each group the data word stored in data flip-flops $X_8$ is to be added to the word in data flip-flops $X_9$. Assume these words to be binary numbers with their least significant bits to the right. The addition is to be performed on all groups of data whose cells are marked by having $X_1=1$. This marking could be the result of a previous sequence of operations which used the associative properties of the array to identify those data groups which are to take part in this addition operation.

A sequence of commands, a program, for performing the addition is given below. Associated with each command is an input pattern which specifies the bit positions which enter into the operation and their values. Bit positions not specified ("don't cares") do not enter into the operation. Following the program is a description of what each command does. Assume that bit position $X_2$, which is used for temporary storage, is cleared to the zero state:

CLEAR MATCH LEFT ($X_1=1$, $X_8=0$, $X_9=0$)

Activate the next cell to the left of each cell containing a matching pattern and deactivate all other cells. This is accomplished by the following four orders in sequence: $RESET_B$; MATCH·$\bar{I}_m$; $RESET_A$; LEFT.

STORE CONDITIONALLY ($X_2=1$)

Store the input pattern in all active cells.

CLEAR MATCH LEFT ($X_1=1$, $X_8=1$, $X_9=1$)

PROPAGATE LEFT ($X_1=1$, $X_2=0$)

Activate all cells between an already active cell and the first cell to its left that does not match the input pattern.

STORE UNCONDITIONALLY ($X_2=0$)

Store the input pattern in all cells.

STORE CONDITIONALLY ($X_2=1$)

Store the input pattern in all active cells.

CLEAR MATCH ($X_1=1$, $X_2=0$, $X_8=0$, $X_9=1$)

Activate all cells containing the input pattern and deactivate all others.

MATCH ($X_1=1$, $X_2=0$, $X_8=1$, $X_9=0$)

Activate all cells containing the input pattern.

MATCH ($X_1=1$, $X_2=1$, $X_8=0$, $X_9=0$)
MATCH ($X_1=1$, $X_2=1$, $X_8=1$, $X_9=1$)

The approach in this addition program is to first generate the carry input to each digit position (cell) and, then, using associative techniques, to determine the sum digits. The carry inputs are generated in the first four operations by locating the addend-augend pairs of 1, 1 and 0, 0. They can be considered "carry generators" and "carry inhibitors," respectively. Carries are then propagated, starting with carry generators, until the carry propagation is annihilated by a carry inhibitor.

Thus, the first operation, CLEAR MATCH LEFT, searches the array for those cells in the marked groups ($X_1=1$) that store carry inhibitors ($X_8=0$, $X_9=0$). This results in the match flip-flops being set in the cells to the left of those cells whose contents match the input pattern. The result in each of these cells is temporarily stored in position $X_2$ by the second operation, STORE CONDITIONALLY, to free the match flip-flops for use in the next operation. The third operation, again a CLEAR MATCH LEFT, searches for the carry generators and activates the cells to their left.

At this point the match flip-flops store the start of the carry chains (the carry generators mapped into carry input terms by the MATCH LEFT command), and these carry chains should activate cells to their left until carry inhibitors are encountered. This is accomplished by the fourth operation, PROPAGATE LEFT. Note the input pattern specified for this operation ($X_1=1$, $X_2=0$). This means that starting at any match flip-flop in the set condition ($MB=1$) the cells to its left will be activated in sequence as long as they belong to the marked set ($X_1=1$) and they do not store a carry inhibition ($X_2=0$). In this manner, carry propagation is accomplished. The result is that the match flip-flop is set in all cells in which the carry input is 1.

In the fifth and sixth operations, STORE UNCONDITIONALLY and STORE CONDITIONALLY, position $X_2$ is cleared and the carry input is stored, freeing the match flip-flops for other uses. The sum digits can now be determined. The following four match operations search the marked groups for those addend, augend, and carry input combinations that produce sum digits of 1. The four input patterns correspond to the four entries that produce sum digits of 1 in an addition truth table. Thus, the four match operations build up in the match flip-flops the union of sets corresponding to the desired sum. This completes the addition operation, leaving the sums stored in the match flip-flops. The result can then be used as desired; it might, for example, be stored in one of the bit positions.

It is important to note what has been accomplished in performing this operation. The addition was performed on two components of all members of the designated set of data groups. This set could be quite large; it could, in fact, include all of the stored data groups. Thus, the associative memory provides the capability for parallel-by-bit, parallel-by-word operations. The duration of these operations is logically independent of the number of members in the sets being processed. The performance of these operations with moderate speed on a fairly large number of data group sets permits the effective addition speed to exceed that of today's fastest computers.

The ability to do bulk addition is interesting; but to be truly useful, the associative memory must have the capability to perform other arithmetic and logical operations. It should be clear that bulk subtraction can be performed in the same manner as above. In fact, the sequence of commands is exactly the same for subtraction; only the patterns for the first and third operations need be changed (to $X_1=1$, $X_8=1$, $X_9=0$ and $X_1=1$, $X_8=0$, $X_9=1$, respectively) to realize the difference $X_8-X_9$.

Shifting of variables is easily accomplished. The sequence,

CLEAR MATCH ($X_l=1$, $X_j=1$)
STORE CONDITIONALLY ($X_j=0$)
CLEAR MATCH LEFT (RIGHT)
STORE CONDITIONALLY ($X_j=1$)

shifts the quantity $X_j$, in the subset marked by $X_1=1$, one place to the left (right). The first command comprises the four orders: $RESET_B$; $MATCH \cdot \bar{I}_m$; $RESET_A$; DOWN. The only cells made active are those which are marked ($X_1=1$) and have $X_j=1$. In the second step a 0 is written in the $X_j$ flip-flop of each of these active cells. In the third step the MB flip-flop in each active cell is set, all cells are then deactivated, and finally the activity conditions are propagated to adjacent cells: $RESET_B$; MATCH; $RESET_A$; LEFT (RIGHT). In the fourth step a 1 is written in the $X_j$ flip-flop in each active cell.

Thus, the associative memory according to my invention has the capability of parallel-by-bit, parallel-by-word addition, subtraction, and shifting. It is well established that given these abilities, any arithmetic operations can be performed.

As is apparent from the above description and an inspection of FIG. 2, to increase the storage capacity of each cell in the Crane et al. system by one bit it is necessary to add one flip-flop, one OR gate, and five AND gates. In accordance with the present invention it is only necessary to add a single magnetic core. While the cost of each cell of the same capacity may be materially reduced the data processing capabilities of the system are impaired. However, as will become apparent below, the impairment is only slight and thus the arrangement of my invention provides not only powerful data processing features but in addition a system of appreciable capacity achieved at relatively little cost.

Figure 4:
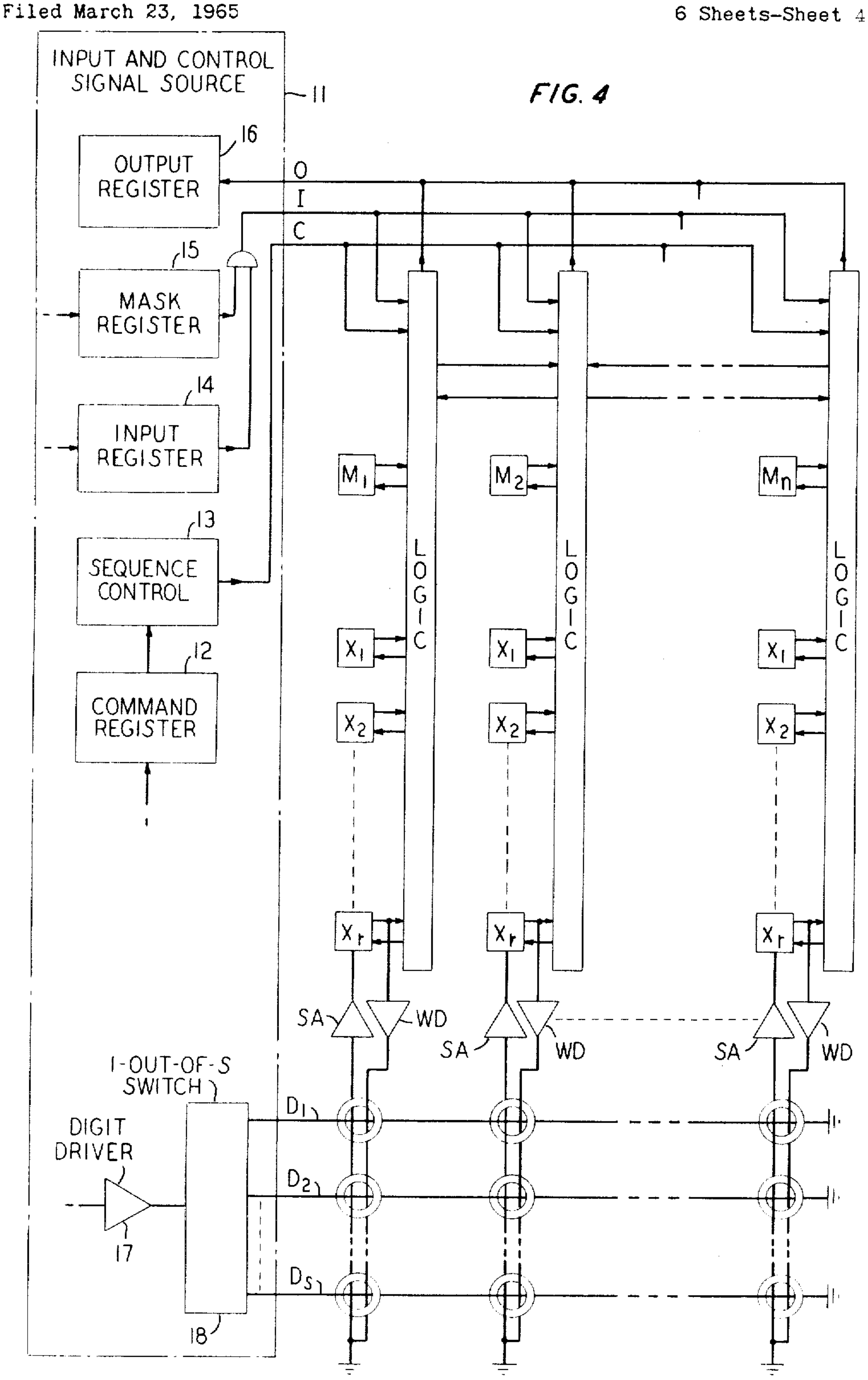
FIG. 4 is a simplified block diagram representation of an associative memory suitable for illustration of this invention.

Referring to FIG. 4 it will be noted that each cell no longer includes $n$ flip-flops. Only $r$ flip-flops are provided where $r$ is less than $n$. The remaining $n-r$ flip-flops are replaced by $s$ magnetic cores with $r+s$ being equal to $n$. Each cell includes MA and MB flip-flops, shown symbolically by element M. Flip-flop $X_r$ in each cell is set and controlled by the logic circuitry in the same manner as are the other data flip-flops. Flip-flop $X_r$ in each cell however can also be set by the output of the sense amplifier SA and in turn can control the operation of the write driver WD. The write driver in turn controls the writing of a bit value in one of the associated cores. The particular core is selected by pulsing the respective row conductor. Input and output conductors are provided only for the $r$ flip-flops in each cell. The $s$ row conductors enable a particular core in each cell to be selected. But the bit value written into the core is determined by the bit value stored in the respective $X_r$ flip-flop and the bit value read-out of the core is directed to the same flip-flop. A bit value may be selectively written into a core only by first writing it into the respective $X_r$ flip-flop and the bit value stored in a core may be read out only by transferring it to the respective $X_r$ flip-flop and then reading out the bit value stored in this flip-flop.

The digit driver 17 in input and control signal source 11 notifies the 1-out-of-$s$ switch 18 which row conductor should be pulsed in order that a particular core in each cell be selected. Each core is threaded by three windings. In addition to the horizontal, or digit, winding, sense and write windings are extended through each core. To read the bit value out of a core switch 18 applies a current to the selected digit conductor which is sufficient to switch all of the cores coupled thereto to the 0 state. If the respective core in each cell was previously in the 1 state a voltage is induced in the sense conductor when the core switches. This voltage is amplified by the sense amplifier and sets the respective $X_r$ flip-flop in the 1 state if a pulse is applied to a common "strobe" conductor (shown in FIGS. 5 and 6). To set a core in the 1 state an opposite polarity current of half the switching value is applied to the respective digit line. When a common "write" conductor is pulsed any $X_r$ flip-flop in the 1 state controls the respective write driver WD to apply a current pulse to the write conductor of half the switching magnitude such that this current, together with the current in the digit line through the selected core, sets the core in the 1 state. The important point to note is that the "hybrid" cell of FIG. 4 operates in the same manner as the cell of FIG. 2 except that input patterns are constrained in that only one of the $s$ digit positions may be specified in any one command. In other words, one may "care" about only one of the $s$ positions at a time. There is no constraint on the $r$ digit positions.

Figure 5:
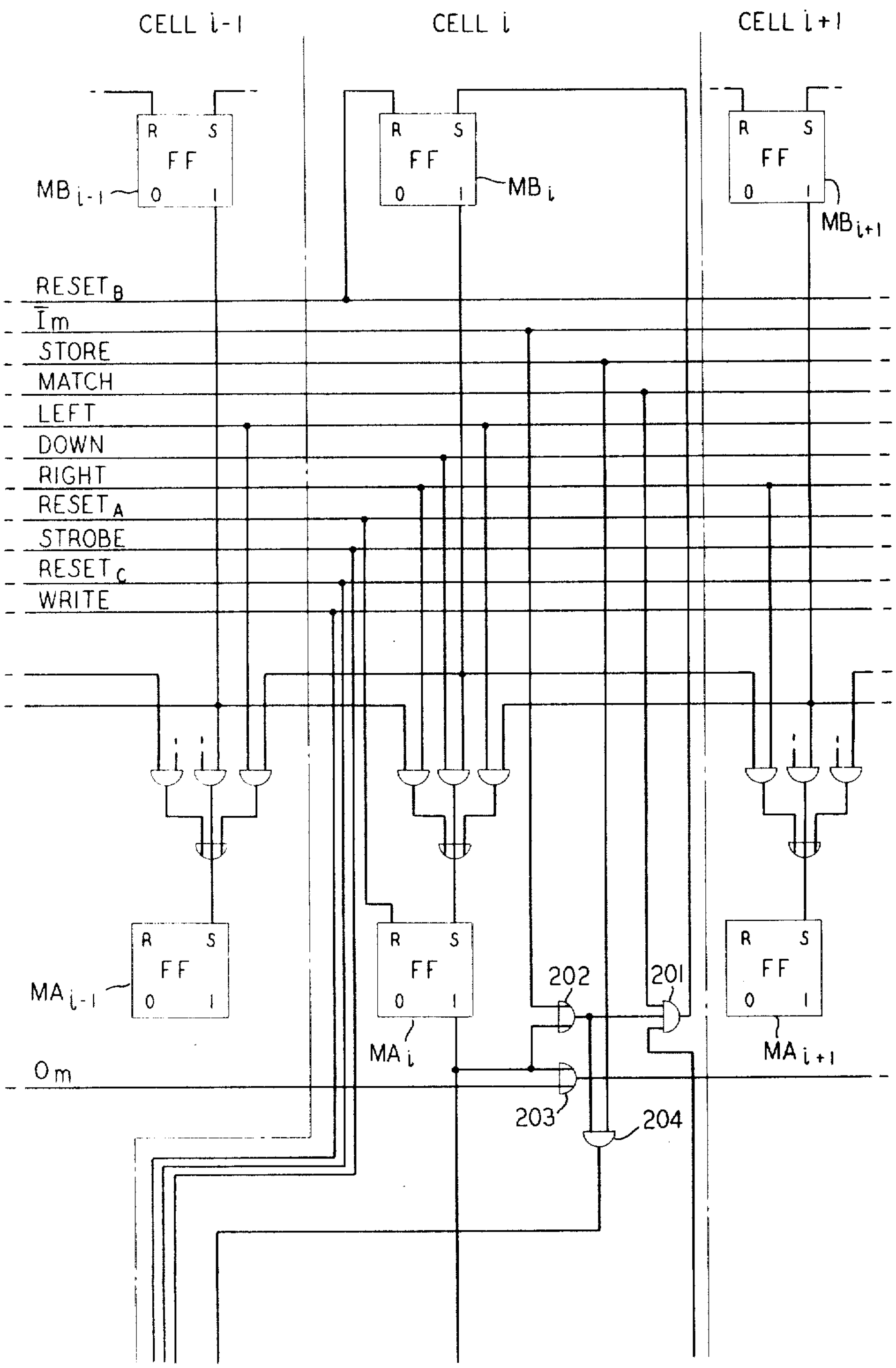
FIGS. 5 and 6, with FIG. 5 being placed on top of FIG. 6, are a schematic representation of an illustrative cell suitable for use in the memory of FIG. 4.
Figure 6:
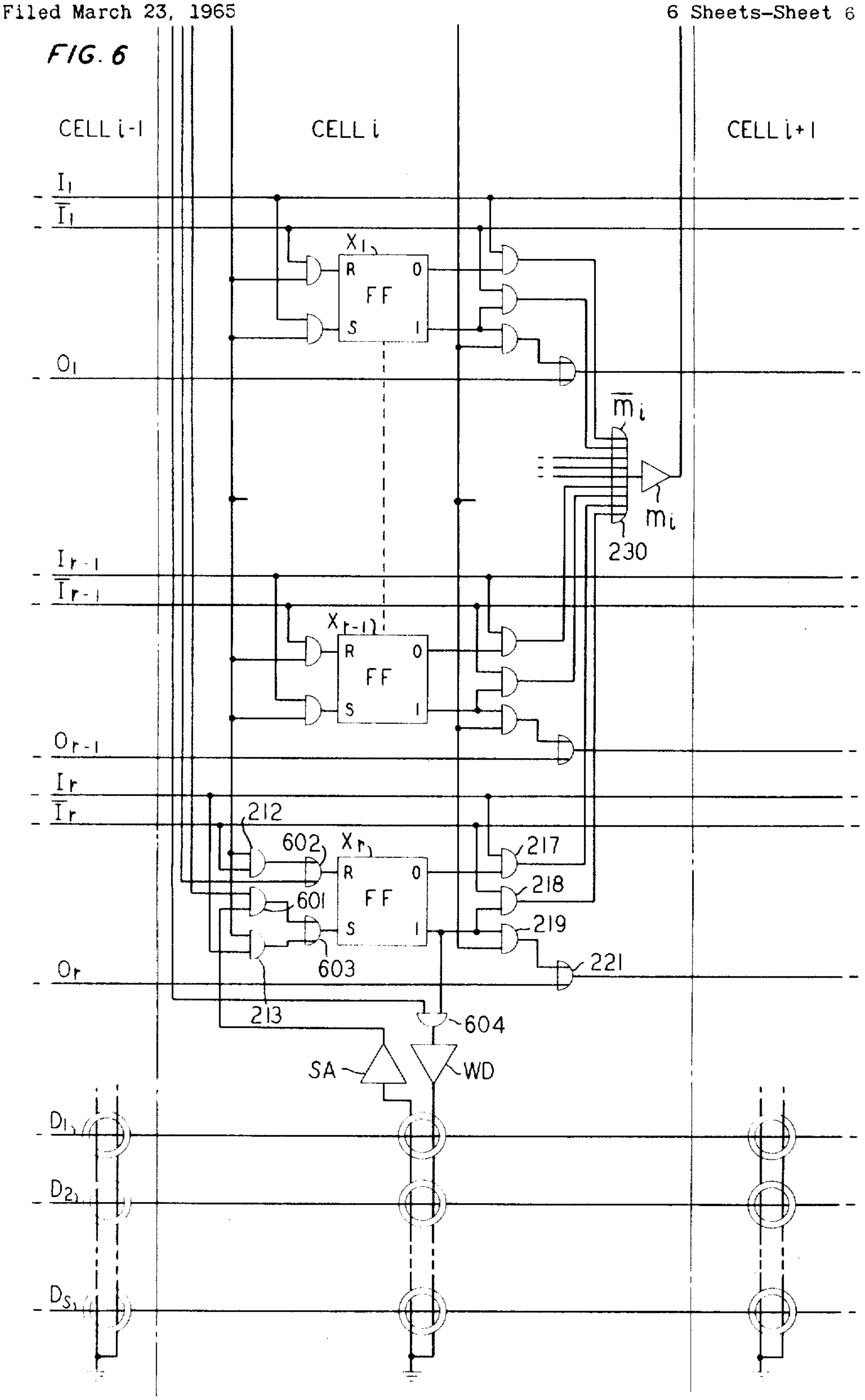

The same numbers have been used in the drawing to indicate equivalent elements in the prior cell of FIG. 2 and the illustrative cell of my invention shown in detail in FIGS. 5 and 6. The connections to flip-flop $X_1$ in the two cells are identical. Similar remarks apply to cells $X_2$ through $X_{r-1}$. The connections to the last flip-flop in FIG. 2 are the same as those to the other flip-flops. The same is not true however in FIG. 6. The numbers used for the elements connected to flip-flop $X_n$ in FIG. 2 are used in FIG. 6 for the equivalent elements connected to flip-flop $X_r$. These numbers are all in the 200 series. The additional elements connected to flip-flop $X_r$ are AND gates 601 and 604, and OR gates 602 and 603.

The same command signals which control the operation of any flip-flop in FIG. 2 control the operations of flip-flop $X_r$ in FIG. 6. AND gates 212 and 213 operate in the same manner in both circuits, and OR gates 602 and 603 in FIG. 6 do not affect the normal operation since these gates each merely serve to enable an additional input to set or reset flip-flop $X_r$. The additional input to OR gate 603 is the $RESET_C$ conductor. A pulse on this conductor passes through OR gate 603 and sets flip-flop $X_r$ in the 0 state. The second input to OR gate 602 is the output of the new AND gate 601. When it is desired to write the bit in a selected core into flip-flop $X_r$ the respective D conductor is pulsed with the full magnitude switching current. All cores in the 1 state are switched to the 0 state and the induced voltage in the sense conductor is amplified by the sense amplifier. Thus if the selected core in cell $i$ was in the 1 state one input of AND gate 601 is energized. The STROBE conductor is pulsed at the same time that one of the D conductors is pulsed and the second input of the AND gate is energized. Thus if the selected core was originally in the 1 state AND gate 601 operates and a pulse is transmitted through OR gate 603 to place flip-flop $X_r$ in the 1 state.

In the read-out sequence the selected core is switched to the 0 state. It is therefore necessary to rewrite a 1 in the core if the core was originally in this state. Following the STROBE pulse a pulse is applied to the WRITE conductor and one input of AND gate 604 is energized. If flip-flop $X_r$ is in the 1 state the second input of AND gate 604 is energized and the output operates the write driver. The current applied at the output of the writer driver is one-half the switching value and tends to set all cores in the 1 state. At the same time that the write pulse is applied the previously energized D conductor is pulsed. This time the current pulse is one-half the switching value, rather than the full switching value, and tends to set the core in the 1 state. Thus if the core was previously in the 1 state a 1 is rewritten into it.

The operation of the cell of FIGS. 5 and 6 may be summarized by the following Boolean equations. The subscript $i$ refers to the $i$-th cell. The subscript $j$ refers to one of the flip-flops $X_1$ through $X_{r-1}$, or one of the respective input conductors I. The subscript $r$ refers to the $r$-th flip-flop and $r$-th input conductors. The term $C_{ik}$ represents the state of one of the cores in the $i$-th cell where $k=1, 2 \ldots s$. The symbol $D_k$ is a 1 when the respective row conductor is pulsed with a current of half the switching value tending to set a core in the 1 state. The symbol 1 indicates that the sequence following, when a 1, sets the associated flip-flop in the 1 state. Similar remarks apply to the symbol 0. For example, in Equation 2, the function following the equal sign, when a 1, sets flip-flop $X_{ij}$ in the 0 state.

(1) $X_{ij}/1=I_j\cdot(MA_i+\bar{I}_m)\cdot\mathrm{STORE}$ (2) $X_{ij}/0=\bar{I}_j\cdot(MA_i+\bar{I}_m)\cdot\mathrm{STORE}\quad j=1, 2 \ldots r-1$ (3) $X_{ir}/1=I_j\cdot(MA_i+\bar{I}_m)\cdot\mathrm{STORE}+\mathrm{SA}\cdot\mathrm{STROBE}$ (4) $X_{ir}/0=\bar{I}_j\cdot(MA_i+\bar{I}_m)\cdot\mathrm{STORE}+\mathrm{RESET}_C$ (5) $MA_i/1=MB_{i-1}\cdot\mathrm{RIGHT}+\mathrm{MB}_i\cdot\mathrm{DOWN}+\mathrm{MB}_{i+1}\cdot\mathrm{LEFT}$ (6) $MA_i/0=\mathrm{RESET}_A$ (7) $MB_i/1=m_i\cdot(MA_i+\bar{I}_m)\cdot\mathrm{MATCH}$ (8) $MB_i/0=\mathrm{RESET}_B$ (9) $\bar{m}_i=I_1\bar{X}_{i1}+\bar{I}_1X_{i1}+I_2\bar{X}_{i2}+\bar{I}_2X_{i2}+\cdots+I_r\bar{X}_{ir}+\bar{I}_rX_{ir}$

(10) $C_{ik}/1=D_k\cdot X_{ir}\cdot\mathrm{WRITE}$ where $k=1, 2 \cdots s$

Equations 1 and 2 are also the setting functions for the $i$-th cell in the Crane et al. system. Equations 3 and 4 are similar except that the $r$-th flip-flop can be set additionally to the 1 state when a STROBE pulse is applied simultaneously with an output pulse from the sense amplifier, and it can be additionally set in the 0 state when the $\mathrm{RESET}_C$ pulse is applied. The setting functions in Equations 5–9 apply to both systems. Equation 10 applies only to FIGS. 5 and 6. The $k$-th core in any cell is set in the 1 state only when the WRITE conductor is pulsed together with conductor $D_k$ provided that flip-flop $X_{ir}$ is in the 1 state.

Due to the fact that some of the bits in each cell are stored in flip-flops and others are stored in cores there are two speeds of operation. Commands in which none of the core positions are specified, i.e., none of conductors $D_1$ through $D_s$ is pulsed, may be performed at speeds determined by the flip-flop and gating circuitry. Commands which specify one of the $s$ core positions are governed by the switching speed of the cores. All operations involving a core require a read-write cycle, unless the desired readout is to be destructive. The output of the selected core in each cell is amplified by the sense amplifier and if it contained a 1 the $r$-th flip-flop is set in the 1 state. Immediately following the STROBE pulse the WRITE pulse is applied in order that the 1 be rewritten in the selected core. Whenever it is desired to change the bit stored in one of the cores the bit value is first placed in the $r$-th flip-flop and the WRITE pulse is then applied together with a pulse on the respective D conductor. It should be noted that if all cores of the same number in the cells, i.e., all cores coupled to a single D conductor, are to be set in the 0 or 1 state a full switching current may be applied to the D conductor to set the cores without involving the operation of the $X_r$ flip-flop in each cell.

The primary advantage of a system incorporating the cell of FIGS. 5 and 6 is that the cost of each cell of the same capacity as that in the Crane et al. system is materially reduced. It is apparent that this is achieved at the expense of data processing capacity because access may not be gained directly to the cores unless all cores in a particular row are to be unconditionally set in either state. However, bulk processing is still possible. For example, consider the example above in which the various words stored in flip-flops $X_8$ and $X_9$ are added together. Suppose it is desired to add the various words stored in the first and last rows of cores. The command sequence described above may be used after the bit stored in the first core in each cell is transferred to flip-flop $X_8$ in the same cell, and the bit stored in the last core is transferred to flip-flop $X_r$. This is easily done in the following seven steps where the symbol $D_1=1$ represents the pulsing of conductor $D_1$ with a current of one-half the switching magnitude tending to set the cores in the 1 state, and $D_1=0$ represents the pulsing of the same conductor with a current of full switching magnitude in the opposite direction.

(1) $\mathrm{RESET}_C$ (2) $\mathrm{STROBE}\cdot(D_1=0)$ (3) $\mathrm{WRITE}\cdot(D_1=1)\cdot\mathrm{RESET}_A\cdot\mathrm{RESET}_B$ (4) $\mathrm{MATCH}\cdot(\bar{I}_m)\cdot(\mathrm{DOWN})(X_r=1)$ (5) $\mathrm{STORE}\cdot\mathrm{RESET}_C(X_8=1)$ (6) $\mathrm{STROBE}\cdot(D_s=0)$ (7) $\mathrm{WRITE}\cdot(D_s=1)$ In this command sequence the operations are performed in every cell. Although as described above the addition may be required only on those groups of data whose cells are marked by having $X_1=1$, the preparatory operations may be performed in all of the cells provided that the information originally in flip-flops $X_8$ and $X_r$ is not required. Thereafter the $X_1$ marking bit in each cell may be used to control the actual addition sequence.

Consider the seven steps in the sequence individually. The first command, a pulse on the $\mathrm{RESET}_C$ conductor, merely places the $X_r$ flip-flop in each cell in the 0 state. In the second step the STROBE conductor is pulsed together with conductor $D_1$. The pulse on conductor $D_1$ is of the full switching magnitude and therefore sets all cores coupled to the conductor in the 0 state. Each core which switches from the 1 to the 0 state operates the respective sense amplifier, which together with the STROBE pulse controls the setting of the respective $X_r$ flip-flop in the 1 state.

Since the read-out is destructive a 1 must be rewritten in those cores which originally contained a 1. In the third step the WRITE conductor is pulsed and AND gate 604 operates in each cell whose $X_r$ flip-flop is in the 1 state. The write driver applies a current of one-half the switching magnitude to the connected column conductor in a direction to set all cores in the cell in the 1 state. The term $D_1=1$ indicates that the $D_1$ conductor is pulsed with a current in the direction to set all cores in the respective row in the 1 state. The current is only one-half the switching value and thus the only cores in the first row which are switched to the 1 state are those which originally contained 1's. At the same time that the write operation takes place the $\mathrm{RESET}_A$ and $\mathrm{RESET}_B$ conductors are pulsed to RESET the MA and MB flip-flops in each cell to the 0 state. All cells are thus inactive at the beginning of Step 4.

In Step 4 the MATCH, $\bar{I}_m$ and DOWN conductors are pulsed. The $X_r=1$ expression indicates that the MATCH operation is concerned only with the state of flip-flop $X_r$. Those cells in which $X_r$ is in the 1 state have an $m_i$ output and thus one input of AND gate 201 is energized. The MATCH pulse energizes a second input of gate 201 in each cell. The $\overline{I}_m$ pulse is transmitted through OR gate 202 in each cell and energizes the third input of the connected AND gate 201. Thus in those cells in which the $X_r$ bit is a 1, AND gate 201 operates and sets the respective MB flip-flop in the 1 state. The DOWN conductor is also pulsed and together with the outputs of the MB flip-flops in the 1 state controls the setting of the respective MA flip-flops. Thus at the end of Step 4 the only cells in the system which are active are those which contain a 1 in the first core.

In the fifth step the STORE conductor is pulsed. A 1 is stored in the $X_8$ flip-flop in each of the active cells. At the same time the $RESET_C$ conductor is pulsed to reset the $X_r$ flip-flop in each cell in preparation for the next step. At the end of the fifth step the bit in each of the first cores also appears in the respective $X_8$ flip-flop. (If the $X_8$ flip-flops are not all reset before the sequence begins, in order to insure that no 1's remain in the $X_8$ flip-flops which should not contain them, all of the $X_8$ flip-flops should be reset, i.e., 0's written in them, before the sequence begins.)

The last two steps control the storage of the bit in the last core of each cell in the respective $X_r$ flip-flop. When the STROBE pulse is applied at the same time that the full switching magnetomotive force is applied to conductor $D_s$ the bit in the last core of each cell is transferred to respective $X_r$ flip-flop. The last step merely controls the rewriting of the bit in the same core since the read-out in Step 6 is destructive. At the end of the sequence the bits in the first and last cores of each cell have been transferred to respective flip-flops $X_8$ and $X_r$. It is now possible to transfer the bits in flip-flops $X_r$ to flip-flops $X_9$ and to then use the command sequence described above to perform the addition. It is also possible to perform the addition using flip-flops $X_8$ and $X_r$ without using flip-flops $X_9$ if in the addition sequence above the term $X_r$ is substituted for the term $X_9$.

Thus bulk processing is still possible even though cores are utilized instead of flip-flops in some of the storage positions. Some additional operations are required but a far cheaper system may be constructed.

In the above-identified Crane et al. application a two-dimensional system is described. The present invention may also be applied to a two-dimensional system. It is possible to extend the X or Y, or both, dimensions by the use of cores. Such extensions will be apparent to those skilled in the art. Thus it is to be understood that the above-described arrangement is merely illustrative of the application of the principles of the invention. Numerous other arrangements may be devised by those skilled in the art without departing from the spirit and scope of the invention.

What is claimed is:

1. A data processor comprising a plurality of cells; each of said cells having a first set of data registers, a second set of data registers, match indicating means, and cell activity condition indicating means; a plurality of means for applying data signals to respective ones of said first data registers in each of said cells; a plurality of means for applying selection signals to respective ones of said second data registers in each of said cells; a plurality of means for reading out the data contained in respective ones of said first data registers in any of said cells in an active condition; a plurality of control conductors extended to each of said cells; and means in each of said cells for performing the following logical operations responsive to signals received over said control conductors:

(1) setting predetermined data in a preselected one of said first data registers in each of said cells, (2) setting a no-match indication in the match indicating means in each of said cells, (3) setting a nonactive condition in the cell activity condition indicating means in each of said cells, (4) storing the data signals applied by said data signal applying means in the respective first data registers in each active cell, (5) setting a match indication in the match indicating means in each active cell if the applied data signals match the contents of the respective first data registers in the cell, (6) writing the data in a selected second data register in each of said cells in the respective preselected one of said first data registers in the same cell, (7) writing the data in said preselected one of said first data registers in a selected second data register in the same cell, and (8) setting an active condition in the activity condition indicating means in each of said cells responsive to a match indication in the match condition indicating means in the same or in an adjacent cell.

2. A data processor in accordance with claim 1 wherein said logical operation performing means further includes means for selectively performing logical operations (4) and (5) independent of the activity conditions of said cells.

3. A data processor comprising a plurality of identical cells; each of said cells having $r$ flip-flops $X_{i1}$ through $X_{ir}$, $s$ magnetic cores $C_{i1}$ through $C_{is}$, an activity flip-flop $MA_i$, and a match flip-flop $MB_i$; $s$ conductor means each coupled to a respective core in each of said cells for setting said cores in the 0 state when a first signal is applied and tending but insufficient to set said cores in the 1 state when a signal $D_k=1$ is applied to conductor means $k$, where $k=1, 2 \ldots s$; and means for extending the binary signals $RESET_B$, $\overline{I}_m$, STORE, MATCH, LEFT, DOWN, RIGHT, $RESET_A$, STROBE, $RESET_C$ and WRITE to each of said cells; each of said cells further including means for developing a binary signal $SA=1$ when any of the respective cores switches from the 1 to the 0 state, and means for setting the respective flip-flops and cores in the $i$-th cell in accordance with the following Boolean equations:

(1) $X_{ij}/1=I_j\cdot(MA_i+\overline{I}_m)\cdot\text{STORE}$, where $j=1, 2 \ldots r-1$ (2) $X_{ij}/0=\overline{I}_j\cdot(MA_i+\overline{I}_m)\cdot\text{STORE}$, where $j=1, 2 \ldots r-1$ (3) $X_{ir}/1=I_j\cdot(MA_i+\overline{I}_m)\cdot\text{STORE}+\text{SA}\cdot\text{STROBE}$ (4) $X_{ir}/0=\overline{I}_j\cdot(MA_i+\overline{I}_m)\cdot\text{STORE}+\text{RESET}_C$ (5) $MA_i/1=MB_{i-1}\cdot\text{RIGHT}+MB_i\cdot\text{DOWN}+MB_{i+1}\cdot\text{LEFT}$ (6) $MA_i/0=\text{RESET}_A$ (7) $MB_i/1=m_i\cdot(MA_i+\overline{I}_m)\cdot\text{MATCH}$, where $m_i$ is the binary inverse of $m_i$; $m_i=I_1\overline{X}_{i1}+\overline{I}_1X_{i1}+I_2\overline{X}_{i2}+\overline{I}_2X_{i2}+\ldots+I_r\overline{X}_{ir}+\overline{I}_rX_{ir}$; and $X_{i1}$ through $X_{ir}$ are binary 1's if the respective flip-flops are in the 1 state (8) $C_{ik}/1=D_k\cdot X_{ir}\cdot\text{WRITE}$, where $k=1, 2 \ldots s$.

4. A data processor comprising a plurality of cells; each of said cells having a first set of data registers, a second set of data registers, match indicating means, and cell activity condition indicating means; a plurality of means for applying data signals to respective ones of said first data registers in each of said cells; a plurality of means for applying selection signals to respective ones of said second data registers in each of said cells; a plurality of means for reading out the data contained in respective ones of said first data registers in any of said cells in an active condition; a plurality of means for extending control signals to each of said cells; means in each of said cells responsive to control signals for setting predetermined data in a preselected one of the respective first data registers and for setting predetermined indications in the respective match indicating means and activity condition indicating means; means responsive to control signals and to data signals for writing said data signals in the respective first data registers and for setting a match indication in the respective match indicating means if the applied data signals match the contents of the respective first data registers in each active cell; means for transferring data between said preselected first data register and a selected one of the respective second data registers in each of said cells; and means for setting an active condition in the activity condition indicating means in each of said cells responsive to a match indication in the match condition indicating means in the same or in an adjacent cell.

5. A data processor in accordance with claim 4 further including means for selectively controlling the operation of said writing and setting means independent of the activity conditions of said cells.

6. An associative memory comprising a plurality of identical cells, each of said cells including a plurality of active data registers and a plurality of passive data registers, means for applying data signals simultaneously to each of said cells, means in each of said cells for indicating an activity condition, means in each of said cells for comparing the contents of said active data registers with respective ones of said data signals, means in each of said cells for setting the respective activity condition indicating means responsive to the operation of the respective camparing means when the cell is in an active condition, means in each of said cells responsive to the respective activity condition indicating means for writing said data signals in the respective active data registers, first controlling means in each of said cells for writing the data contained in any selected one of said passive data registers in a preselected one of said active data registers, second controlling means for writing the data contained in said preselected active data register in any selected one of said passive data registers, and means responsive to said activity condition setting means in each of said cells for propagating activity condition signals to the adjacent cells to set the activity condition indicating means in said adjacent cells.

7. An associative memory in accordance with claim 6 further including means for applying a control signal to each of said cells for controlling the operation of said activity condition setting means and said writing means independent of the activity condition indicating means in each of said cells.

8. An associative memory in accordance with claim 6 further including means for extending a control signal to the preselected active data register in each of said cells for writing predetermined data in said preselected active data register.

9. An associative memory in accordance with claim 6 wherein each of said passive data registers is a magnetic core, and further including a plurality of conductors each coupled to a respective core in each of said cells and means for energizing one of said conductors to select the respective coupled core in each of said cells.

10. An associative memory comprising a plurality of storage cells; each of said cells including a plurality of flip-flops, a plurality of magnetic cores; and means for transferring data between a selected one of said flip-flops and all of said cores; means for activating one of said cells; means for storing data in the flip-flops in said active cell; means for comparing the data stored in the flip-flops in said active cell with applied signals; means for controlling the operation of said transferring means; and means for propagating the activity condition from one of said cells to another of said cells.

11. An associative memory in accordance with claim 10 further including a plurality of conductors each coupled to a respective core in each of said cells and wherein said transferring means includes first conductor means coupling all of the cores in each of said cells to the selected one of said flip-flops for setting said selected flip-flop in the 1 state if one of said cores switches from the 1 state to the 0 state when a first current flows in the respective conductor, and second conductor means coupling the selected flip-flop in each of said cells to the respective cores for setting a selected core in the 1 state if the selected flip-flop is in the 1 state when a second current flows through the respective conductor.

12. An associative memory in accordance with claim 11 wherein said activating means includes means in each cell responsive to the comparing means in the same cell and means in each cell responsive to a propagated activity condition from at least one other of said cells.

13. In an associative memory having a plurality of cells and means for applying control singals and data signals to each of said cells; each of said cells including a plurality of data registers, comparing means, activity condition indicating means, and means responsive to the concurrent application of said control signals and said data signals for writing said data signals in said data registers, for operating said comparing means dependent upon the information content of said data registers and said data signals, and for setting the activity condition indicating means in the same cell or in another of said cells dependent upon the operation of said comparing means all in accordance with the particular control signals applied to the cell; the improvement comprising a plurality of magnetic cores in each of said cells, a plurality of means each coupled to a respective core in each of said cells for selecting one of the cores in each of said cells, first and second control means extended to each of said cells, and means in each of said cells responsive to a signal received over said first control means for transferring the data in a selected core to a preselected one of said data registers and responsive to a signal received over said second control means for transferring the data in said preselected data register to a selected one of said cores.

14. An associative memory comprising a plurality of storage cells; each of said cells including a first plurality of storage devices, a second plurality of storage devices, and means for transferring data between a selected one of said first devices and all of said second devices; means for activating said cells; means responsive to data signals applied to an active cell for storing the data signals in said first devices and for comparing the data signals with the data stored in said first devices to operate the activating means in the same cell or in another of said cells; and means for selecting one of said second devices in each of said cells to be operated upon by the transferring means in the same cell.

15. An associative memory in accordance with claim 14 wherein said transferring means in each of said cells is operated independent of the activity condition of the cell and further including means for selectively controlling the storing and comparing of data in each of said cells independent of the activity condition of said cell.

16. In an associative memory having a plurality of cells and means for applying control signals and data signals to each of said cells; each of said cells including a plurality of data registers, means for performing logical operations dependent upon the data stored in said data registers and the data signals applied to the cell in accordance with the control signals applied to the cell, and means for transmitting signals to others of said cells in accordance with the operation of said logical operation performing means; the improvement comprising a plurality of magnetic cores in each of said cells, a plurality of means each coupled to a respective core in each of said cells for selecting one of the cores in each of said cells, first and second control means extended to each of said cells, and means in each of said cells responsive to a signal received over said first control means for transferring the data in a selected core to a preselected one of said data registers and responsive to a signal received over said second control means for transferring the data in said preselected data register to a selected one of said cores.

17. In an associative memory having a plurality of cells and means for applying control signals and data signals to each of said cells; each of said cells including a plurality of data registers, means for performing logical operations dependent upon the data stored in said data registers and the data signals applied to the cell in accordance with the control signals applied to the cell, and means for transmitting signals to others of said cells in accordance with the operation of said logical operation performing means; the improvement comprising a plurality of storage devices in each of said cells, a plurality of means for selecting one of said storage devices in each of said cells, and means extended to each of said cells for controlling the transfer of data from a selected storage device to a preselected one of said data registers in each cell and for controlling the transfer of data from said preselected data register to a selected one of said storage devices.

18. In an associative memory having a plurality of cells and means for applying control signals and data signals to each of said cells; each of said cells including a plurality of data registers, means for performing logical operations dependent upon the data stored in said data registers and the data signals applied to the cell in accordance with the control signals applied to the cell, and means for transmitting signals to others of said cells in accordance with the operation of said logical operation performing means; the improvement comprising a plurality of storage devices in each of said cells, and means extended to each of said cells for selecting one of said storage devices in each cell and for controlling the transfer of data between said selected storage device and a preselected one of said data registers.

19. An associative memory comprising a plurality of storage cells; each of said cells including a first plurality of storage elements and a second plurality of storage elements; means for extending control signals and data signals to each of said cells; means in each of said cells for performing logical operations on the respective first storage devices dependent upon the data signals transmitted to the cell and the data stored in said first storage devices in accordance with the control signals extended to the cell; and means in each of said cells for controlling the transfer of data between a preselected one of said first storage devices and all of said second storage devices in the cell.

20. An associative memory comprising a plurality of storage cells; each of said cells including a first plurality of storage elements and a second plurality of storage elements; means for extending control signals and data signals to each of said cells; means in each of said cells for performing logical operations on the respective first storage devices dependent upon the data signals transmitted to the cell and the data stored in said first storage devices in accordance with the control signals extended to the cell; and means in each of said cells for controlling the transfer of data between the respective first storage devices and the respective second storage devices in accordance with the control signals transmitted to the cell.

21. An associative memory comprising a plurality of cells; each of said cells including a plurality of storage devices; means for extending control signals and data signals to each of said cells; means in each of said cells responsive to transmitted control signals and data signals for changing the data stored in a selected group of the respective storage devices; and means in each of said cells responsive to transmitted control signals for transferring data between the respective selected group of said storage devices and the remaining storage devices in the same cell.

22. An associative memory comprising a plurality of cells; means for extending information signals to each of said cells; means in each of said cells for storing data; means in each of said cells responsive to some of said information signals for performing logical operations on the data contained in some of the respective data storing means; and means in each of said cells responsive to the remaining information signals for transferring data between said some data storing means and the remaining data storing means in the cell.

References Cited

UNITED STATES PATENTS

| | | | |
|---|---|---|---|
| 3,121,217 | 2/1964 | Seeber et al. | 340—174 |
| 3,252,145 | 5/1966 | Denison et al. | 340—172.5 |
| 3,299,409 | 1/1967 | Herman | 340—172.5 |

ROBERT C. BAILEY, *Primary Examiner.*

G. D. SHAW, *Assistant Examiner.*